(12) United States Patent
Beau et al.

(10) Patent No.: US 11,247,372 B2
(45) Date of Patent: Feb. 15, 2022

(54) METHOD OF FABRICATING A TRIM AND CORRESPONDING TRIM

(71) Applicant: FAURECIA INTERIEUR INDUSTRIE, Nanterre (FR)

(72) Inventors: Godefroy Beau, La Garenne Colombes (FR); Gérald Marchetto, Saint Just (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 375 days.

(21) Appl. No.: 15/167,674

(22) Filed: May 27, 2016

(65) Prior Publication Data

US 2016/0346974 A1 Dec. 1, 2016

(30) Foreign Application Priority Data

May 28, 2015 (FR) .................................... 15 54808

(51) Int. Cl.
*B60R 13/02* (2006.01)
*B32B 3/30* (2006.01)
(Continued)

(52) U.S. Cl.
CPC ........ *B29C 45/14786* (2013.01); *B29C 43/18* (2013.01); *B29C 53/04* (2013.01);
(Continued)

(58) Field of Classification Search
CPC ....... Y10T 428/2419; Y10T 428/24215; Y10T 428/24777; Y10T 428/15; Y10T 428/24273; Y10T 428/24248; Y10T 428/24314; B60R 13/02; B60R 13/0256; E04F 19/028; E04F 13/073; E04C 2/405; B32B 2605/003; B32B 3/04; B32B 3/266; B29C 53/06; B29C 53/063; B29C 53/066;
(Continued)

(56) References Cited

U.S. PATENT DOCUMENTS 2,274,765 A * 3/1942 Zalkind ................ A47B 96/201
220/560.01
3,903,663 A * 9/1975 Bainter .................. B62D 29/00
52/79.1
(Continued)

FOREIGN PATENT DOCUMENTS

JP 2000054593 A * 2/2000
WO WO9833634 A1 8/1998
(Continued)

OTHER PUBLICATIONS

Translation of WO 2004098854A2. (Year: 2004).*
(Continued)

*Primary Examiner* — Catherine A. Simone
(74) *Attorney, Agent, or Firm* — Reising Ethington P.C.

(57) ABSTRACT

A method for fabricating a vehicle interior trim having a support (4) and a surface covering (6) that covers the support (4), the covering having a front face (6A) intended to be visible and a rear face (6B) turned toward the support (4). The method includes producing a line of weakness (14) in the covering (6), bending the covering (6) along the line of weakness (14), and molding the support (4) against the rear face (6B) of the covering (6).

13 Claims, 2 Drawing Sheets

(51) Int. Cl.
- *B29C 43/18* (2006.01)
- *B29C 53/04* (2006.01)
- *B29C 70/44* (2006.01)
- *B29L 31/30* (2006.01)
- *B29C 45/14* (2006.01)
- B29K 711/14 (2006.01)
- B29K 105/20 (2006.01)
- B29K 101/10 (2006.01)
- B29K 105/08 (2006.01)

(52) U.S. Cl.
CPC ............. *B29C 70/443* (2013.01); *B32B 3/30* (2013.01); *B60R 13/02* (2013.01); *B29C 2045/14729* (2013.01); *B29K 2101/10* (2013.01); *B29K 2105/089* (2013.01); *B29K 2105/206* (2013.01); *B29K 2711/14* (2013.01); *B29L 2031/302* (2013.01); *B29L 2031/3005* (2013.01); *B29L 2031/3041* (2013.01); *B32B 2605/003* (2013.01)

(58) Field of Classification Search
CPC ................ B29C 53/02; B29C 53/04; B29C 2045/14729; B29C 45/14786; B29C 43/18; B29C 70/443; B29L 2031/302; B29L 2031/3041; B29L 2031/3005; B29K 2101/10; B29K 2105/089; B29K 2105/206; B29K 2711/14

USPC .................. 428/31, 121, 130, 131, 134, 136
See application file for complete search history.

(56) References Cited

U.S. PATENT DOCUMENTS

| | | | |
|---|---|---|---|
| 4,533,588 A | 8/1985 | Kraft | |
| 5,698,283 A * | 12/1997 | Yamasaki | B29C 51/14 280/728.3 |
| 2004/0048043 A1 | 3/2004 | Sentani et al. | |
| 2004/0094856 A1 * | 5/2004 | Delcros | B29C 44/1257 264/46.5 |
| 2004/0164531 A1 * | 8/2004 | Riha | B29C 59/16 280/732 |
| 2011/0281131 A1 * | 11/2011 | Roberts | B32B 1/00 428/542.2 |

FOREIGN PATENT DOCUMENTS

| | | |
|---|---|---|
| WO | WO2004098854 A2 | 11/2004 |
| WO | WO2012008477 A1 | 1/2012 |

OTHER PUBLICATIONS

Translation of JP2000054593A (bib and description). (Year: 2000).*
French Search Report, in French, corresponding to application No. FR1554808, dated Apr. 6, 2016, 2 pages.

* cited by examiner

METHOD OF FABRICATING A TRIM AND CORRESPONDING TRIM

TECHNICAL FIELD

The present invention relates to a method for fabricating a trim, in particular a trim for a vehicle, in particular a motor vehicle.

BACKGROUND

In a motor vehicle, it is possible to provide a trim comprising a covering.

For ease and cost of fabrication reasons, it is possible to use a thin covering fastened on a support. However, in order to increase the quality perceived by the user, it is desirable for the covering to appear thick.

SUMMARY

One of the aims of the invention is to propose a method for fabricating a trim comprising a covering, the trim having a high perceived quality and being able to be obtained easily and at a low cost.

To that end, the invention proposes in at least some embodiments a method for fabricating a trim comprising a support and a covering that covers the support, the covering having a front face intended to be visible and a rear face turned toward the support, the method comprising producing a line of weakness in the covering, bending the covering along the line of weakness, and molding the support against the rear face of the covering.

Providing a line of weakness allows easy bending of a first region of the covering relative to a second region of the covering to form a rim, with a small curve radius at the bend, thus visually giving the impression that the rim corresponds to the edge of the covering and that the covering is thick. The molding of the support against the covering contributes to obtaining a small curve radius at the bend.

According to specific embodiments, the method comprises one or more of the following features, considered alone or according to any technically possible combination(s):
- the line of weakness is made by cutting a notch on the front face or the rear face of the covering or by crushing the covering to form a slot on the front face of the covering and/or a slot on the rear face of the covering;
- the covering is bent so as to separate the edges of the notch or the slot, or bring them closer together;
- the covering has a depth such that the notch extends in a decorative layer of the covering, and in particular extends through the decorative layer;
- the covering comprises at least one decorative layer;
- the decorative layer is a ligneous layer, a metal layer, a textile layer, whether woven or nonwoven, a plastic layer reinforced with fibers, or a mineral layer;
- the covering is a laminate complex, the covering comprising a laminated reinforcing layer against the decorative layer; and
- the covering is a ligneous laminate complex, the decorative layer being ligneous.

The invention also relates to a trim comprising a support and a covering that covers the support, the covering having a front face intended to be visible and a rear face turned toward the support, in which the covering is bent along a line of weakness of the covering so as to form a rim and the support is molded against the rear face of the covering.

According to specific embodiments, the trim comprises one or more of the following features, considered alone or according to any technically possible combination(s):
- the covering comprises at least one decorative layer;
- the decorative layer is a ligneous layer, a metal layer, a textile layer, whether woven or nonwoven, a plastic layer reinforced with fibers, or a mineral layer;
- the covering is a laminate complex, the covering comprising a laminated reinforcing layer against the decorative layer;
- the covering is a ligneous laminate complex, the decorative layer being ligneous; and
- the trim is a motor vehicle trim.

BRIEF DESCRIPTION OF THE DRAWINGS

The invention and its advantages will be better understood upon reading the following description, provided solely as an example, and done in reference to the appended drawings, in which.

DETAILED DESCRIPTION OF THE ILLUSTRATED EMBODIMENTS

Figure 4:
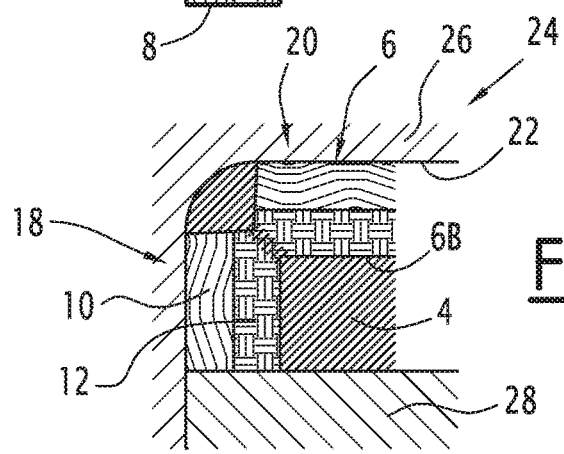
Figure 5:
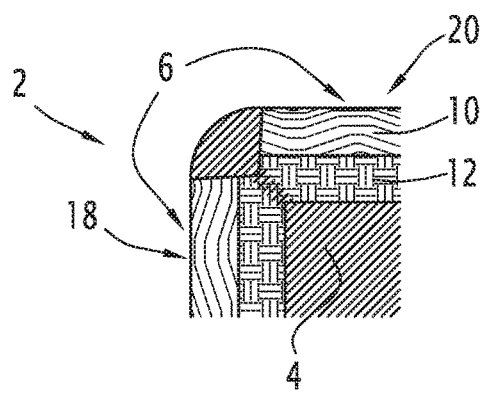

The fabrication method illustrated in FIGS. 1 to 5 makes it possible to fabricate a trim 2 comprising a support 4 and a covering 6 that covers the support (FIG. 5).

In one embodiment, the trim is a vehicle trim, in particular for a motor vehicle.

The fabrication method comprises a first step (FIG. 1) for providing the covering 6.

The covering 6 is in the form of a plate. The covering 6 has a front face 6A, intended to be visible, and a rear face 6B, intended to be turned toward the support 4.

The covering 6 has a thickness e, considered perpendicular to the front face 6A and the rear face 6B, that is substantially uniform. The thickness e of the covering is for example less than or equal to 1.5 mm, in particular less than or equal to 1 mm, and preferably less than or equal to 0.8 mm.

The covering 6 has a free edge 8.

The covering 6 comprises at least one decorative layer 10 intended to be visible.

In the illustrated example, the decorative layer 10 is for example a ligneous decorative layer 10 made from lignocellulosic fibers. The decorative layer 10 is for example a wood sheet, preferably a natural wood sheet. The covering 6 comprises a single ligneous layer or several superimposed ligneous layers.

Alternatively, the decorative layer 10 is a metal layer, a textile layer, whether woven or nonwoven, a plastic layer reinforced with fibers, or a mineral layer. A metal layer is for example a metal foil, in particular an aluminum foil. A textile layer is for example a woven layer of natural or synthetic fibers, in particular cotton fibers, wool fibers, hemp fibers, plastic fibers. A plastic layer reinforced with fibers is a plastic reinforced with carbon fibers (CFRP for Carbon Fiber Reinforced Plastic) or aramid fibers (also known under the trade name Kevlar). A mineral layer is for example a layer of schist rock, for example slate or mica.

The covering 6 comprises a laminated reinforcing layer 12 on the decorative layer 10 on the side of the rear face 6B of the covering 6. The reinforcing layer 12 is for example adhered to the decorative layer 10 using an adhesive.

The reinforcing layer 12 reinforces the ligneous layer 10 and promotes the subsequent adhesion of the support 4 on the covering 6.

The reinforcing layer 12 is in particular a textile layer, woven or nonwoven, a layer of paper, a cardboard layer, a plastic film or a metal foil.

A laminated covering comprising several assembled superimposed layers may be designated by the term "complex" or "laminated complex".

When the covering 6 comprises a ligneous decorative layer 10 and a reinforcing layer 12 that are superimposed, it is generally referred to as wood sheet complex (WSC).

In one advantageous embodiment, the decorative layer 10 is ligneous and the reinforcing layer 12 is a textile layer, woven or nonwoven, or a metal foil, for example an aluminum foil.

In another advantageous embodiment, the decorative layer 10 is a metal foil, in particular an aluminum foil, and the reinforcing layer 12 is a textile layer, woven or nonwoven.

Optionally, the covering 6 comprises a protective layer (not shown) covering the decorative layer 10 on the side of the front face 6A.

In particular in the case of a ligneous decorative layer 10, the protective layer is for example a UV protection layer.

The protective layer is for example a synthetic resin layer, for example a varnish. The protective layer is transparent or translucent, and optionally colored.

The protective layer is for example applied on the decorative layer in liquid state and dried to harden.

The fabrication method comprises a second step (FIG. 2) for producing a line of weakness 14 in the covering 6.

The line of weakness 14 is made between a first marginal region 18 adjacent to the edge 8 and a second main region 20. The first region 18 is defined between the line of weakness 14 and the edge 8.

The line of weakness 14 is made so as to locally give the covering 6 and increased flexibility around the line of weakness 14, allowing bending of the covering 6 along the line of weakness 14.

The line of weakness 14 is made without separation of the first marginal region 18 and the second region 20. The first region 18 and the second region 20 remain connected after producing the line of weakness 14.

Figure 1:
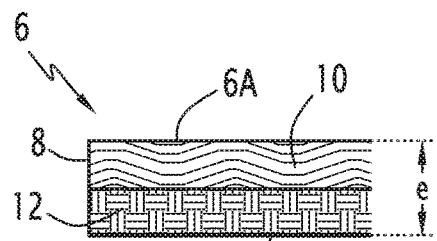
FIGS. 1 to 5 show steps of a method for fabricating a trim.
Figure 2:
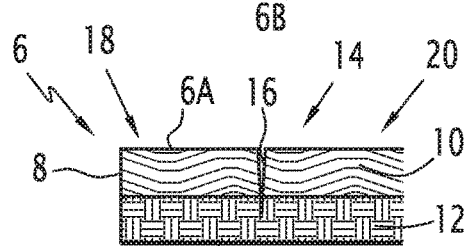
Figure 3:
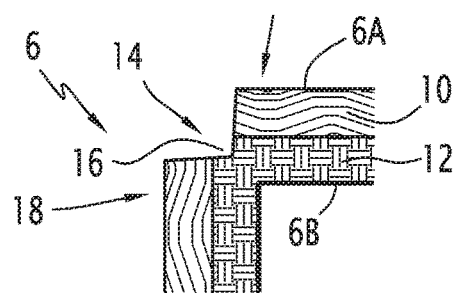

In FIG. 2, the line of weakness 14 is formed by cutting a notch 16 in the covering 8, more specifically in the visible face 6A of the covering 6. The notch 16 extends in the decorative layer 10.

As illustrated, the depth of the notch 16 is such that the notch 16 crosses through the decorative layer 10 and extends into the reinforcing layer 12. The depth of the notch 16 is greater than the thickness of the decorative layer 10.

Alternatively, the depth of the notch 16 is such that the notch 16 stops in the decorative layer 10, before the reinforcing layer 12. The depth of the notch 16 is smaller than the thickness of the decorative layer 10.

Preferably, the notch 16 extends over the face of the covering in which it is formed, here the visible face 6A, continuously. Alternatively, the notch 16 extends in dotted lines.

The notch 16 is in particular made using a laser cutting device or using a cutting blade pushed into the covering 6 to a controlled depth so as not to completely cut the covering 6. A continuous notch 16 is in particular made using a laser cutting device or using a blade having a continuous cutting edge. A notch 16 in dotted lines is in particular made using a laser cutting device or using a blade having a cutting edge provided with a plurality of teeth.

The fabrication method comprises a third step (FIG. 3) for bending the covering 6 along the line of weakness 14.

The covering 6 is bent by folding down the first region 18 on the side of the rear face 6B of the covering 6, the first region 18 forming a rim protruding relative to the first region 20 on the side of the rear face 6B of the covering 6.

The covering 6 here is bent so as to move away the edges of the notch 16 formed in the visible face 6A of the covering 6.

The fabrication method comprises a fourth step (FIG. 4) for molding the support 4 against the rear face 6B of the bent covering 6.

In the illustrated embodiment, the covering 6 is positioned against a molding surface 22 of a mold 24, the front face of the covering 6 being turned toward the molding surface 22, and the support 4 is molded under pressure against the rear face 6B of the covering 6, such that the support 4 presses the covering 6 against the molding surface 22 during the molding of the support 4.

In one embodiment, the support 4 is molded by injection in a mold 24 comprising two mold parts 26, 28, the molding surface 22 being supported by one of the mold parts 26, 28.

To perform the injection molding of the support 4, the mold 24 is opened by separating the mold parts 26, 28, the covering 6 is inserted in the mold 24 to bear by its front face 6A against the molding surface 22, the mold 24 is closed by bringing the mold parts 26, 28 together, and liquid plastic material is injected under pressure in the mold 24 such that the plastic material presses the covering 6 against the molding surface 22.

When the plastic material is solidified enough, the mold 24 is opened and the trim 2 comprising the support 4 covered by the covering 6 is removed from the mold (FIG. 5).

As illustrated in FIG. 4, if the depth of the notch 16 is such that it crosses through the ligneous layer 8, and if the reinforcing layer 12 is porous (e.g., a textile layer), the plastic material injected under pressure may cross through the reinforcing layer 12 and fill in the notch 16. The choice of a support 4 made from a material having a color close to that of the decorative layer 10 makes it possible to decrease the visibility of the support 4 on the edge of the trim 2.

The dimensions of the cover 6 are in practice very small, such that the bead of plastic material filling in the notch 16 is practically invisible to the user, who does not perceive the difference in material along the bend.

If the depth of the notch is such that the notch 16 does not cross through the decorative layer 10, during the injection molding, the plastic material pushes back the decorative layer 10 so as to shape it against the molding surface 22 while closing the notch 16. The notch 16 becomes practically imperceptible for the user.

The pressurized plastic material pressing the covering 6 against the molding surface 22 allows precise shaping of the covering 6 with a very small curve radius, with filling in of the notch 16 by deformation of the covering 6 or by the material of the support 4.

In one alternative, the support 4 is formed by compression molding a plastic material. To that end, the covering 6 and the plastic material in the viscous state are introduced into the open mold 24, then the mold 24 is closed while compressing the plastic material and pressing it against the rear face 6B of the covering 6. The covering 6 is then pressed against the molding surface 22. Once the plastic material is solidified, the mold 24 is opened to obtain the trim 2.

In one alternative, the support 4 is molded by thermoforming a sheet of thermoplastic material that is heated, then pressed against the covering 6 so as to press the covering 6 against the molding surface 22.

In one embodiment using a mold 24 with two mold parts 26, 28, the covering 6 is positioned with its front face 6A against the molding surface 22, the sheet is positioned between the two separated mold parts 24, 26, then the sheet is pressed against the covering 6 by bringing the mold parts 24, 26 closer to one another.

In one alternative embodiment using a mold 24 having a single mold part 26 bearing the molding surface 22, the covering 6 is positioned with its front face 6A against the molding surface 22, the sheet is placed across from the covering, then the sheet is pressed against the covering 6 by applying a pressure difference on either sides of the sheet. The sheet is pressed against the covering 6 by a vacuum created between the covering 6 and the sheet, or by an overpressure generated on the side of the sheet opposite the covering 6.

In one alternative, the support 4 is formed by molding a sheet made from a thermosetting material that is pressed against the covering 6 so as to press the covering 6 against the molding surface 22, then heated so as to solidify.

The molding of the sheet of thermosetting material is done similarly to the molding of the sheet of thermoplastic material, in a mold 24 having two mold parts 26, 28 brought closer together to mold the sheet of thermoplastic material or in a mold having a single mold part 26 bearing the molding surface 22, with the creation of a vacuum or overpressure to press the sheet of thermoplastic material.

The sheet of thermosetting material is in particular a preimpregnated sheet (or "prepreg"), i.e., a woven or nonwoven textile impregnated with thermosetting resin.

Figure 6:
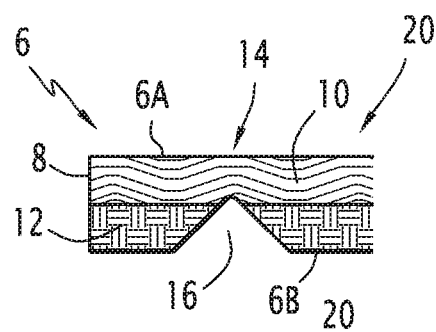
FIGS. 6 to 8 show steps of a method for fabricating a trim according to an alternative.
Figure 7:
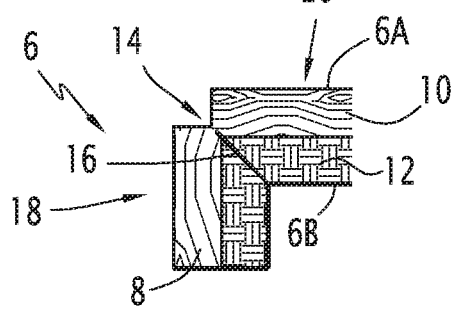
Figure 8:
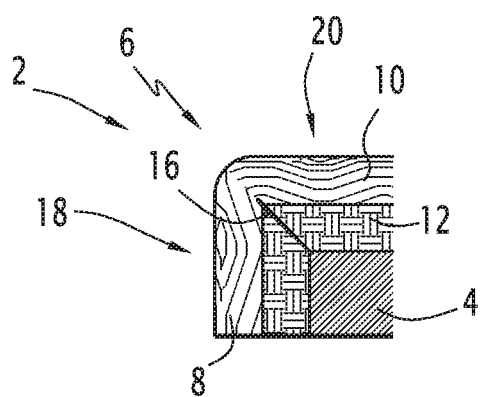

The embodied method of FIGS. 6 to 8 differs from that of FIGS. 1 to 5 in that the notch 16 is formed on the rear face 6B of the covering to form the line of weakness 14.

As shown in FIG. 6, the notch 16 is V-shaped with an opening angle greater than 45°, preferably greater than 80°.

The notch 16 is formed in the reinforcing layer 12.

The depth of the notch 16 is such that the notch extends into the decorative layer 10, without crossing through it. This allows a local increase in the flexibility of the decorative layer 10. Alternatively, the depth of the notch 16 is such that the notch 16 stops before the decorative layer 10.

As illustrated in FIG. 7, the bending is done by closing the notch 16, i.e., by bringing the edges of the notch 16 closer together.

Furthermore, optionally and as illustrated in FIG. 7, the decorative layer 10 is at least partially broken along the line of weakness 14 due to the bending of the covering 6 along the line of weakness 14. More specifically, the decorative layer 10 here is broken on the surface on the side opposite the reinforcing layer 12. Alternatively, the decorative layer 10 is not broken along the line of weakness 14 during the bending.

The support 4 is next molded against the covering 6 similarly to the method of FIGS. 1 to 5.

As illustrated in FIG. 8, during the molding of the support 4, the pressure exerted by the support 4 on the side of the rear face 6B of the covering 6 presses the decorative layer 10 against the molding surface 22. Thus, a bevel with a small curve radius may be formed.

Even if the decorative layer 10 is broken, in particular on the surface, it has been observed that the pressure exerted on the side of the rear face 6B of the covering 6 during the shaping of the support 4 pushes the decorative layer 10 so as to close the tear and form a chamfer with a surface continuity between the first region and the second region, in particular when the decorative layer 10 is ligneous.

Figure 9:
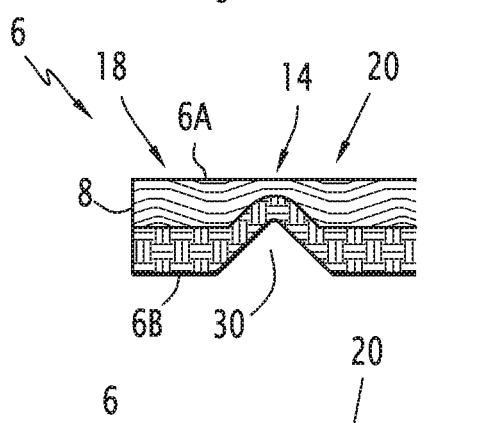
FIGS. 9 to 10 show steps of a method for fabricating a trim according to another alternative.
Figure 10:
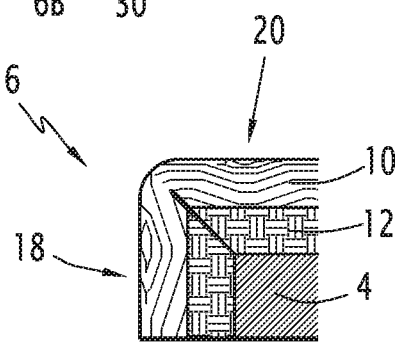

The fabrication method of FIGS. 9 and 10 differs from that of FIGS. 1 to 5 and 6 to 8 in that the line of weakness 14 is formed by crushing the covering 6 so as to form a thinner line defining the line of weakness 14.

As illustrated in FIG. 9, the crushing is done on the side of the rear face 6B, such that a slot 30 is formed on the rear face 6B and the front face 6A is intact after the crushing.

Alternatively, the crushing is done on the side of the front face 6A such that a slot is formed on the front face 6A and the rear face 6B is intact, or on both sides of the covering 6, such that a respective slot is formed on each of the front face 6A and the rear face 6B.

During crushing of the covering 6, the thickness of the covering is reduced by 60 to 80%, in particular approximately 70%, along the line of weakness 14.

Next, the covering 6 is bent along the line of weakness 14 and the support 4 is molded against the rear face 6B of the covering 6 similarly to the embodiments of FIGS. 1 to 5 and FIGS. 6 to 8.

In the different embodiments, the formation of a line of weakness 14, along which the covering 6 has a greater flexibility, the bending of the covering 6 and the molding of the support 6 against the rear face 6B of the covering 6 make it possible to obtain a rim formed by a first region 18 of the covering 6 bent relative to a second region 20 of the covering 6, giving the illusion that the first region 18 is the edge of the second region 20, and that the covering 6 is thick. The rim formed by bending a first region 18 of the covering 6 provides continuity with the second region 20 of the covering 6, ensuring the discretion of the method.

The molding of the support 4 on the rear face 6B of the covering 6 makes it possible to keep the covering 6 bent. The fabrication is easy and inexpensive. The molding of the support 4 against the rear face 6B of the covering 6 further makes it possible to obtain a bend with a small curve radius, increasing the illusion that the first bent region 18 corresponds to the thickness of the covering 6.

The trim 2 is made at a lower cost and using little material, and in particular little wood, while having a high perceived quality for the user.

Preferably, the molded support 4 is rigid.

Preferably, the bending of the covering 6 and the molding of the support 4 are done sequentially. The bending of the covering 6 is done before the molding of the support 4.

The invention claimed is:

1. A trim comprising a support and a surface covering that covers the support, the covering having a front face intended to be visible and a rear face turned toward the support, in which the covering includes a bend along a line of weakness of the covering so as to form a rim and the support is formed from a plastic material molded against the rear face of the covering, wherein the covering comprises a decorative layer and a reinforcing layer laminated on the decorative layer on a side of the decorative layer opposite the front face of the covering, wherein the line of weakness is formed in the front face of the covering, extending through the decorative layer and only partially through the reinforcing layer such that the line of weakness is open along the bend, and wherein the plastic material fills the open line of weakness formed in the front face along the bend.

2. The trim according to claim 1, wherein the support is directly attached to the rear face of the covering by being molded against the rear face of the surface covering.

3. The trim according to claim 1, wherein a first region and a second region of the covering extend away from opposite sides of the bend at different angles.

4. The trim according to claim 1, wherein the rim is formed by a first region of the covering protruding relative to a second region of the covering on the side of the rear face of the covering, the first and second regions being on opposite sides of the bend.

5. The trim according to claim 1, wherein the support has a thickness and the rim extends along the support in the thickness direction to cover an edge of the support.

6. The trim according to claim 1, the trim being a motor vehicle trim.

7. The trim according to claim 1, wherein the decorative layer is a ligneous decorative layer.

8. A method for fabricating the trim of claim 1, the method comprising producing the line of weakness in the covering, bending the covering along the line of weakness so as to form the rim, and molding the plastic material to form the support against the rear face of the covering.

9. The method according to claim 8, wherein the line of weakness is made by cutting a notch.

10. The method according to claim 9, wherein the covering is bent so as to move the edges of the notch or the slot away from each other.

11. The method according to claim 8, wherein a notch cut in the covering has a depth such that the notch extends through the decorative layer of the covering.

12. The method according to claim 8, wherein the decorative layer is a ligneous decorative layer.

13. The method according to claim 8, wherein the line of weakness is made by crushing the covering to form a slot.

\* \* \* \* \*